W. EBERHARD.
CARPET RAG CUTTER.
No. 107,236.    Patented Sept. 13, 1870.
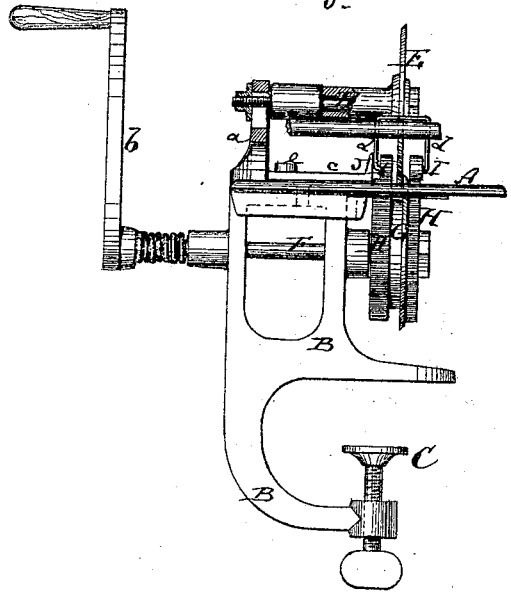
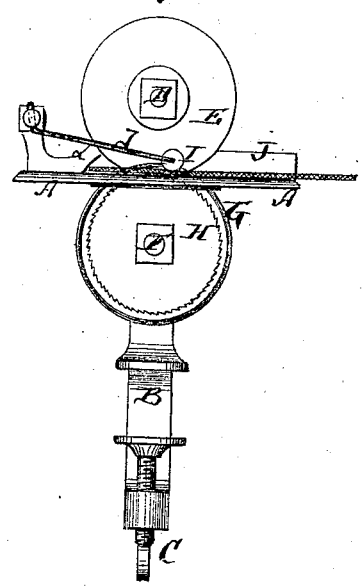
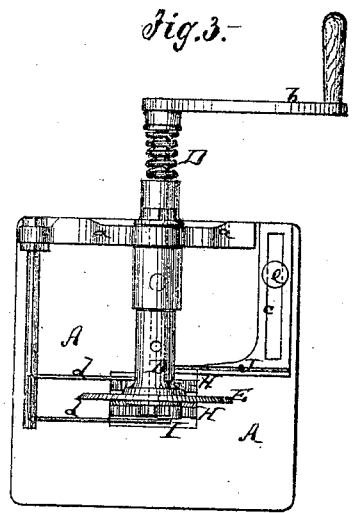

United States Patent Office.

WILLIAM EBERHARD, OF AKRON, OHIO, ASSIGNOR TO HIMSELF AND J. P. ALEXANDER, OF SAME PLACE.

Letters Patent No. 107,236, dated September 13, 1870.

IMPROVEMENT IN CARPET-RAG CUTTER.

The Schedule referred to in these Letters Patent and making part of the same

*To all whom it may concern:*

Be it known that I, WILLIAM EBERHARD, of Akron, in the county of Summit and State of Ohio, have invented a new and improved Carpet-rag Cutter; and I do hereby declare that the following is a full, clear, and exact description thereof, which will enable others skilled in the art to make and use the same, reference being had to the accompanying drawing forming part of this specification.

Figure 1 represents a side view, partly in section, of my improved rag-cutter.

Figure 2 is an end view of the same.

Figure 3 is a plan or top view of the same.

Similar letters of reference indicate corresponding parts.

My invention relates to machines for cutting rags and analogous material, and consists in certain improvements thereon, which will be first described in connection with all that may be necessary to a clear understanding thereof, and then specified in claim.

A in the drawing represents the table of my improved rag-cutter.

The table is supported on a frame, B, which stands either directly on the ground or support, or which, by means of a screw, C, can be clamped to a bench or other fixed device.

In a standard, a, which projects from the table A, are the bearings of a horizontal shaft, D, which carries a rotary cutter, E, at one end.

Another shaft, F, is hung in the frame B, under the table A and parallel to D. It carries also a rotary cutter, G.

The cutting-edges of the disks E G overlap each other through a slot in the table A, and a pair of rotary shears is thus produced.

Upon the shaft F are mounted, on both sides of the disk G, a pair of feed-rollers, H H, which project above the surface of the table, as shown.

I I are a pair of pressure-rollers, hung on the end of spring shanks d, which press them upon the feed-rollers.

The end of the fabric to be cut is placed between the feed and pressure-rollers, and will, as the shaft F is revolved by means of a crank, b, or otherwise, be drawn along and fed to the shears E G, in the desired manner.

The width of the strips to be cut is regulated by means of a gauge, J, which is secured upon the table A, and which has a slotted shank, c, to be set at any suitable distance from the cutters.

A screw, e, passing through said slotted shank, serves to clamp the gauge to the table in the desired position.

A spiral spring on the shaft D serves to hold the shears together, as shown.

Having thus described my invention,

I claim as new and desire to secure by Letters Patent—

1. The combination, in a rag-cutting machine, of two rotary knives, E G, with a pair of notched feeding-disks, H H, arranged, respectively, on each side of one of the cutters, and projecting above the cloth-supporting plate, as shown and described.

2. The combination of two notched disks, H H, with two pressure-rolls, I I, arranged relatively with respect to each other and the cutters, as described, to feed and hold in position the material to be operated on.

3. An improved carpet-rag cutter, containing the following instrumentalities, arranged and combined as specified, namely: a pair of rotary cutters, E G, a pair of notched disks, H H, a pair of spring pressure-rolls, I d I d, and a supporting-table, A.

Witnesses:    WILLIAM EBERHARD.
  WM. T. ALLEN,
  S. EDGERTON.